(12) United States Patent
Krasniqi et al.

(10) Patent No.: US 11,540,260 B1
(45) Date of Patent: Dec. 27, 2022

(54) DYNAMIC PUCCH ALLOCATION

(71) Applicant: T-Mobile USA, Inc., Bellevue, WA (US)

(72) Inventors: Gezim Krasniqi, Bellevue, WA (US); John Humbert, Roeland Park, KS (US); David Jones, Bellevue, WA (US); Brett Christian, Independence, MO (US); George Cummings, Gilbert, AZ (US)

(73) Assignee: T-Mobile USA, Inc., Bellevue, WA (US)

( * ) Notice: Subject to any disclaimer, the term of this patent is extended or adjusted under 35 U.S.C. 154(b) by 67 days.

(21) Appl. No.: 17/176,113

(22) Filed: Feb. 15, 2021

(51) Int. Cl.
*H04W 72/04* (2009.01)
*H04W 72/08* (2009.01)

(52) U.S. Cl.
CPC ..... *H04W 72/0413* (2013.01); *H04W 72/085* (2013.01)

(58) Field of Classification Search
CPC ............... H04W 72/0413; H04W 72/085
USPC ............................................... 370/329
See application file for complete search history.

(56) References Cited

U.S. PATENT DOCUMENTS

| | | | |
|---|---|---|---|
| 11,197,206 B1* | 12/2021 | Oroskar | H04W 36/30 |
| 2017/0041922 A1* | 2/2017 | Chen | H04W 28/24 |
| 2019/0045499 A1* | 2/2019 | Huang | H04W 72/0446 |
| 2021/0100004 A1* | 4/2021 | Yang | H04W 72/0446 |

* cited by examiner

Primary Examiner — Chi Tang P Cheng

(57) ABSTRACT

Solutions for physical uplink control channel (PUCCH) allocation, for example on a 5G network, include receiving, at a base station (BS) on a network, a session request message from a user equipment (UE) requesting a network session; based on at least receiving the session request message, determining a channel quality of a channel between the UE and the BS; based on at least the channel quality, selecting a first PUCCH format; and transmitting a message, from the BS, to the UE, instructing the UE to configure the PUCCH according to the first selected PUCCH format. Some examples further include: monitoring for a format change trigger; based on at least detecting the format change trigger, selecting a second PUCCH format different than the first PUCCH format; and transmitting a message, from the BS, to the UE, instructing the UE to configure the PUCCH according to the second selected PUCCH format.

20 Claims, 8 Drawing Sheets

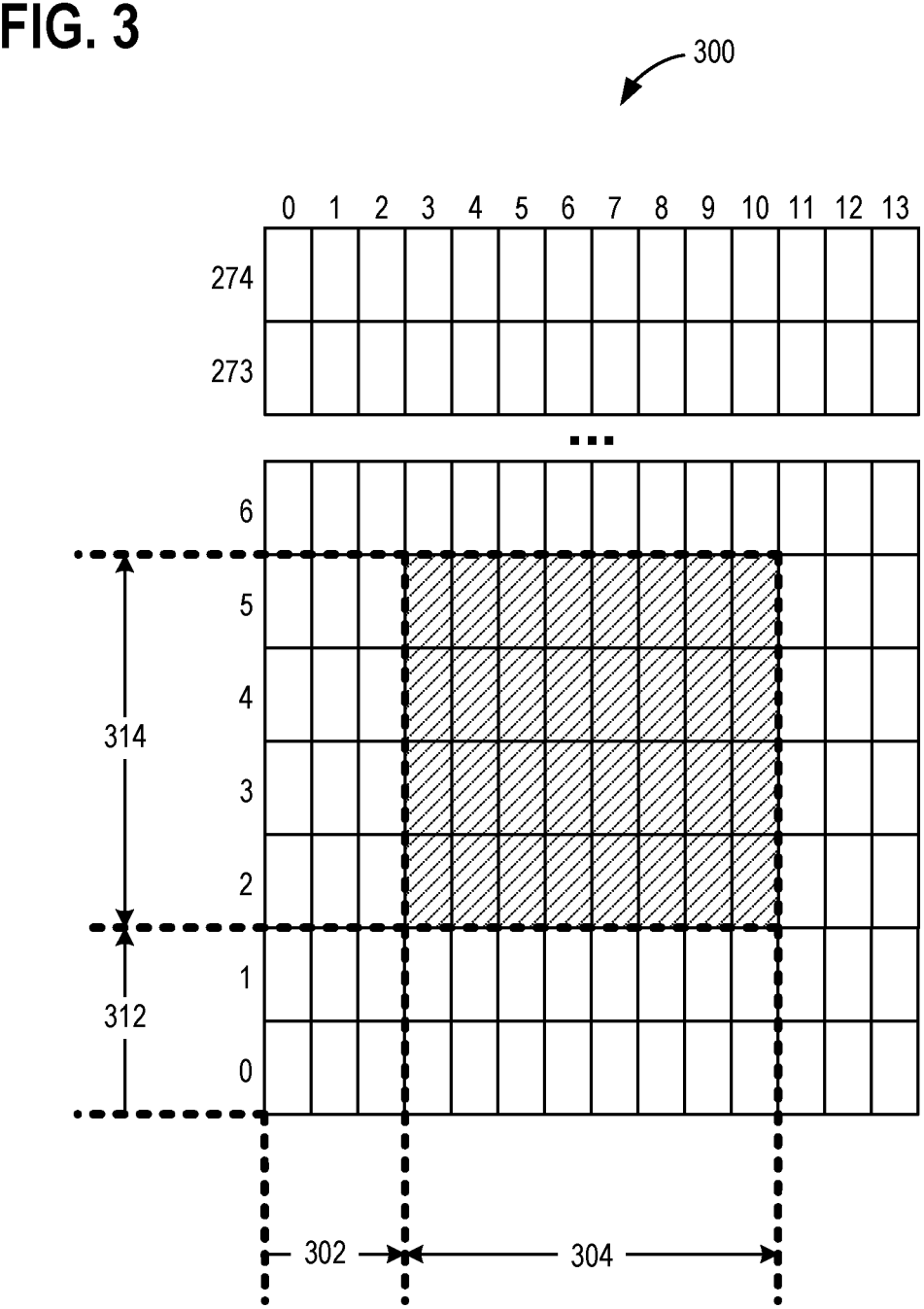

DYNAMIC PUCCH ALLOCATION

BACKGROUND

Dedicated Physical Uplink Control Channel (PUCCH) resources are allocated, by the base station (BS), for the devices that transition from idle to connected mode. Multiple formats are available for the PUCCH, and the particular PUCCH format used affects users performance, for example data throughput and the likelihood of dropping a call. For example, with a shorter PUCCH format, more physical resource blocks (PRBs) are available for the physical uplink shared channel (PUSCH), providing higher uplink throughput, although call drops may be more likely. A longer PUCCH format enables more robust PUCCH transmission resulting to higher reliability, but at the expense of PUSCH throughput. The PUCCH format impacts the coverage of a particular cell.

Currently, the PUCCH format is configured at the BS (e.g., the resources for a particular format length, short or long, are allocated). This initial PUCCH configuration at the BS does not consider the radio conditions. However, the channel conditions that are expected at the time of BS configuration may not be static. UEs may move closer to or further from the BS, affecting signal power, and interference levels may change. Thus, the dynamic configuration of PUCCH format length may become sub-optimal in certain scenarios.

SUMMARY

The following summary is provided to illustrate examples disclosed herein, but is not meant to limit all examples to any particular configuration or sequence of operations.

Solutions for physical uplink control channel (PUCCH) allocation includes receiving, at a base station (BS) on a network, a session request message from a user equipment (UE), the session request message requesting a network session; based on at least receiving the session request message from the UE, determining a channel quality of a channel between the UE and the BS; based on at least the channel quality between the UE and the BS, selecting a first PUCCH format; and transmitting a message, from the BS, to the UE, instructing the UE to configure the PUCCH according to the first selected PUCCH format. Some examples further include: monitoring for a PUCCH format change trigger; based on at least detecting the PUCCH format change trigger, selecting a second PUCCH format different than the first PUCCH format; and transmitting a message, from the BS, to the UE, instructing the UE to configure the PUCCH according to the second selected PUCCH format.

BRIEF DESCRIPTION OF THE DRAWINGS

The disclosed examples are described below with reference to the accompanying drawing figures listed below, wherein:

FIG. 3 illustrates an exemplary physical resource block (PRB) arrangement for the arrangement of FIG. 1;

Figure 1:
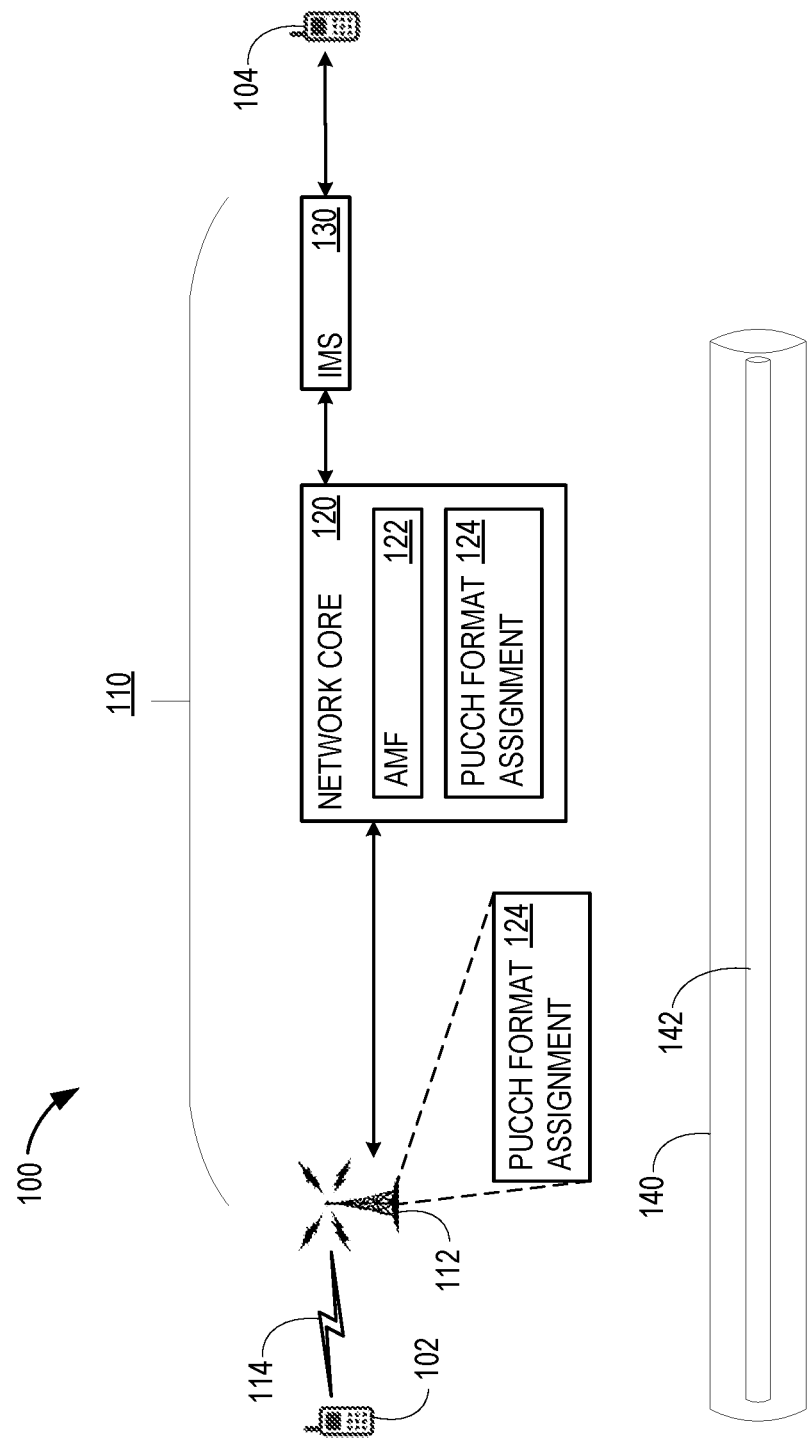
FIG. 1 illustrates an exemplary arrangement that advantageously employs dynamic physical uplink control channel (PUCCH) allocation.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for physical uplink control channel (PUCCH) allocation includes receiving, at a base station (BS) on a network, a session request message from a user equipment (UE), the session request message requesting a network session; based on at least receiving the session request message from the UE, determining a channel quality of a channel between the UE and the BS; based on at least the channel quality between the UE and the BS, selecting a first PUCCH format; and transmitting a message, from the BS, to the UE, instructing the UE to configure the PUCCH according to the first selected PUCCH format. Some examples further include: monitoring for a PUCCH format change trigger; based on at least detecting the PUCCH format change trigger, selecting a second PUCCH format different than the first PUCCH format; and transmitting a message, from the BS, to the UE, instructing the UE to configure the PUCCH according to the second selected PUCCH format.

Aspects of the disclosure improve both the throughput and reliability of cellular network data traffic by selecting a PUCCH format based on at least the channel quality between the UE and the BS. Aspects of the disclosure further improve both the throughput and reliability of cellular network data traffic by monitoring for a PUCCH format change trigger and, based on at least detecting the PUCCH format change trigger, selecting a second PUCCH format different than the first PUCCH format. Aspects of the disclosure select from among available PUCCH formats to optimize coverage and capacity based on the location and environment (e.g., path loss, interference, etc.) of the UE. Fifth generation mobile networks (5G) leverage a feature known as bandwidth parts (BWPs). BWPs provide enhanced flexibility in assigning resources for a carrier, for example, enabling multiple, different signal types to be transmitted within a given bandwidth.

Dynamically allocating PUCCH resources results in improvements in coverage near cell edges and improvements in PUCCH Uplink capacity/throughput near the center of the cell (when the UE is nearer to the BS). For example, long duration PUCCH format may be used when channel quality is lower, to prevent dropped calls, and short duration PUCCH format may be used when channel quality permits (e.g., is of sufficient quality), in order to improve throughput. An assessment of the channel conditions may be performed during call set-up to select the optimal PUCCH format (according to some optimization scheme or performance scoring), and some examples perform on-going assessment and may change the PUCCH format when channel conditions warrant a change (e.g., the UE has moved closer to or farther from the BS).

Criteria for selecting and/or triggering a change in PUCCH formats may include knowledge of hand over (HO)

triggers, geographic boundaries, location of the UE relative to the BS, bit error rate (BER) measurements, signal-to-interference-plus-noise ratio (SINR), dropped call rates, and feedback from the network. Mechanisms to cause the UE to change to the new format (e.g., by instructions from the BS), may include radio resource control (RRC) protocol and downlink control information (DCI). DCI provides the UE with information from the BS, such as physical layer resource allocation and power control commands.

With reference now to the figures, FIG. 1 illustrates an exemplary arrangement 100 that advantageously employs dynamic PUCCH allocation. In arrangement 100, a UE 102 on a network 110 attempts to initiate a voice call with a distant telephone, which may be a landline telephone or another UE, for example UE 104. UE 102 has a default session 140 and, within default session 140, a dedicated network session 142. In this illustrated example, network session 142 comprises a voice call, for example, a voice over new radio (VoNR) call. For voice calls, network session 142 may be a guaranteed bit rate (GBR) session. In some examples, network session 142 may comprise a video call or a general data packet exchange, such as uploading or downloading files.

UE 102 communicates with network 110 using an air interface 114 to BS 112. In some examples, BS 112 comprises a 5G gNodeB (gNB). In some examples, network 110 may include a mixture of 5G and 4G cells. As illustrated, network 110 includes a core network 120 that has a 5G Core Access and Mobility Management Function (AMF) 122 that receives connection and session related information from UE 102. AMF 122 acts as an access point for UE 102 to core network 120. Network 110 may be distributed, for example, with various nodes at differing geographical locations. Core network 120 and AMF 122 may each likewise have various nodes distributed among differing geographical locations. Core network 120 enables UE 102 to connect through an IP multimedia subsystem (IMS) 130, for example, using a proxy-call session control function (P-CSCF). IMS 130 provides an architectural framework for delivering IP-based multimedia services, and provides a pathway (via other services not shown, for example a telephone network) to and from UE 104.

Figure 2:
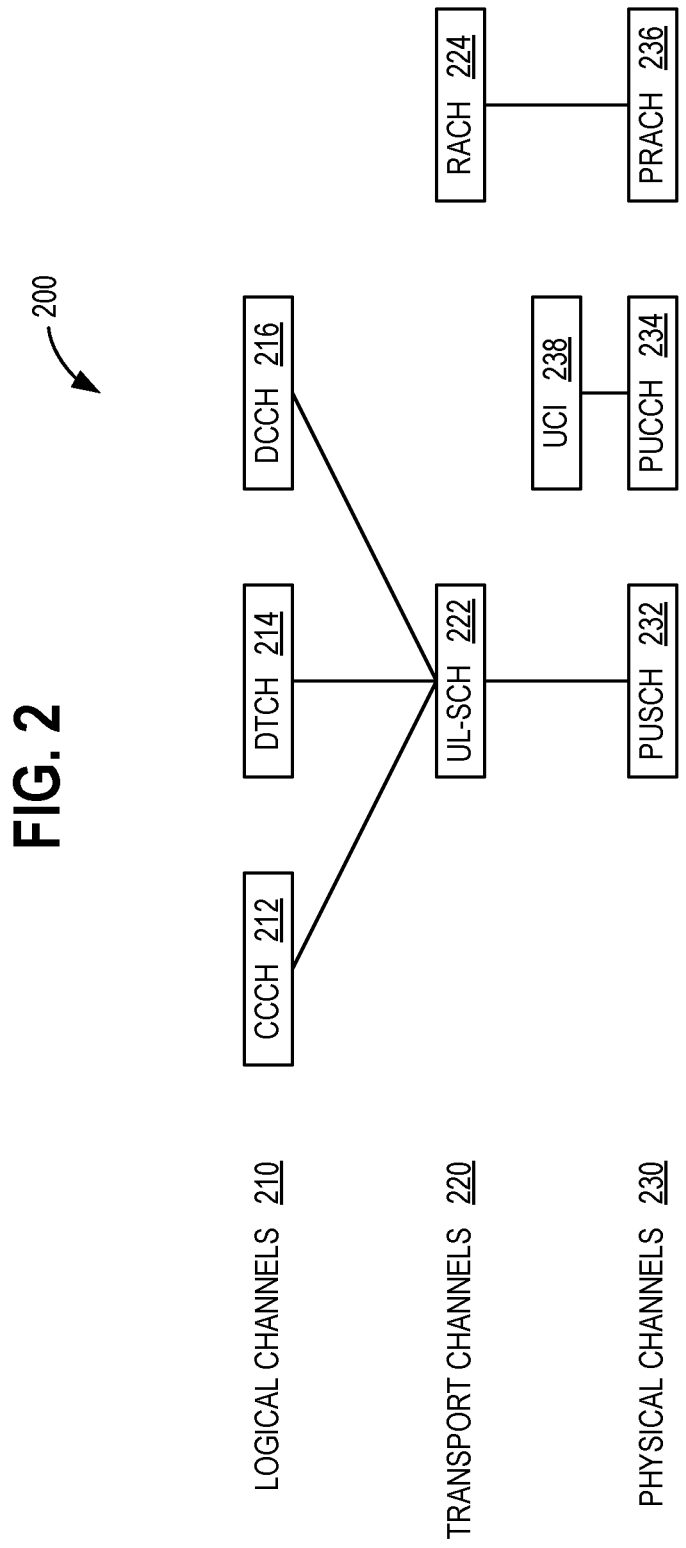
FIG. 2 illustrates an exemplary representation of various channels of the architecture of FIG. 1.

A PUCCH format assignment function 124 provides logic and control for allocating PRBs for the PUCCH format, as described below. In some examples, PUCCH format assignment function 124 is located at BS 112. In some examples, PUCCH format assignment function 124 is within core network 120. In some examples, PUCCH format assignment function 124 has components at BS 112 also within core network 120. In some examples, PUCCH format assignment function 124 comprises AI. FIG. 2 illustrates an exemplary representation 200 of various channels of arrangement 100, including a PUCCH 234. Representation 200 has a logical channel layer 210, a transport channel layer 220, and a physical channel layer 230. A logical channel is defined by the type of information it carry and is generally differentiated as a control channel, used for transmission of control and configuration information or as a traffic channel used for the user data. Logical channel layer 210 includes a common control channel (CCCH) 212, used for transmission of control information to UEs; a dedicated traffic channel (DTCH) 214, used for transmission of user data to/from a UE; and a dedicated control channel (DCCH) 216, used for transmission of control information to/from a UE.

A transport channel is defined by how and with which characteristics the information is transmitted over the radio interface. Data on a transport channel are organized into transport blocks. Transport channel layer 220 includes an uplink shared channel (UL-SCH) 222, used for transmission of uplink data, and a random access channel (RACH) 224. Physical channels correspond to sets of time-frequency resources used for transmission of particular transport channel content, control information, or indicator information. Each transport channel is mapped to a corresponding physical channel. Physical channel layer 230 includes a PUSCH 232, PUCCH 234, and a physical random access channel (PRACH) 236. PUSCH 232 is the physical uplink channel that carries user data and radio resource control (RRC) signaling messages. PUSCH 232 feeds UL-SCH 222 which, in turn, feeds CCCH 212, DTCH 214, and DCCH 216. PRACH 236 is used for the initial access requests from users, and feeds RACH 224.

PUCCH 234 conveys uplink control information (UCI) 238 to BS 112. UCI 238 includes hybrid automatic repeat request (HARQ) feedback, scheduling requests (SRs), and channel quality information in the form of channel state information (CSI). In some examples, PUSCH 232 also carries UCI 238. CSI may be used, as explained below in determining a channel quality of a channel (e.g., air interface 114) between UE 102 and BS 112. PUCCH 234 may also carry multiple input multiple output (MIMO) information and binary phase shift keying (BSK) and quadrature phase shift keying (QPSK) modulation information. The allocation of PUCCH 234 among the different formats (which vary in length) may either consume or free PRBs, thereby affecting the number of PRBs available for PUSCH 232, and ultimately affecting uplink throughput. Downlink control information (DCI) is carried by a physical downlink control channel (PDCCH), which is not shown.

FIG. 3 illustrates an exemplary PRB arrangement 300 which may be allocated for PUCCH 234, as described herein. Arrangement 300 shows a grid of PRBs, differentiated by 0-13 symbols and subcarrier frequency index 0-274. A PRB comprises 12 consecutive subcarriers for one 0.5 millisecond (mS) time slot, and is the smallest element of resource allocation. Various regions 302, 304, 312, and 314 of arrangement 300 are indicated as being occupied by PRBs allocated to PUCCH 234 for various formats.

PUCCH 234 may take on one of multiple different formats, which may be differentiated by duration (short or long), length of symbols (1 to 14), the number of UCI bits (1 or 2, or more than 2), and the number of PRBs used. Format 0 (F0, F-zero) is a short duration format that spans 1 or 2 symbols, carries 1 or 2 UCI bits, and uses a single PRB. Format 1 (F1) is a long duration format that spans 4 to 14 symbols, carries 1 or 2 UCI bits, and uses a single PRB. Format 2 (F2) is a short duration format that spans 1 or 2 symbols, carries more than 2 UCI bits, and uses 1 to 16 PRBs. Format 3 (F3) is a long duration format that spans 4 to 14 symbols, carries more than 2 UCI bits, and uses 1 to 6, 8 to 10, 12, 15, or 16 PRBs. Format 4 (F4) is a long duration format that spans 4 to 14 symbols, carries more than 2 UCI bits, and uses a single PRB.

Region 312 of arrangement 300 indicates the location for the starting PRB for all PUCCH formats. Region 302 indicates the location where the starting symbols begin for all formats, where the range of values depends on the specific format. Region 304 indicates the number of symbols for all formats, where the range of values depends on the specific format. Region 314 is used for PUCCH 234 only when PUCCH 234 is in F2 and F3.

PUCCH 234 should be transmitted (by UE 102, over air interface 114) with enough power that the received power (by BS 112) decodes control information with a sufficiently low BER. In general, decoding performance is not determined by the absolute received signal strength but rather by the received SINR. Power control for PUCCH 234 may be described by the following expression:

$$P_{PUCCH} = \min\{P_{CMAX,c}, P_{O,PUCCH} + PL_{DL} + \Delta_{Format} + \delta\} \quad \text{Eq. (1)}$$

where $P_{PUCCH}$ is the PUCCH transmit power in a given subframe, $PL_{DL}$ is the downlink path loss as estimated by UE 102, $P_{CMAX,c}$ is the per-carrier maximum, and $P_{O,PUCCH}$ is a cell-specific parameter that is broadcast as part of the cell system information. The value $\delta$ is a power control value, which is used by BS 112 to control the transmit power of UE 102, and $\Delta_{Format}$ is a format-specific term (e.g., specific to one of F0, F1, F2, F3 and F4).

Therefore, BER varies with the SINR of the channel between UE 102 and BS 112 differently for the different formats F0-F4. The capacity remaining for PUSCH 232 also varies the different formats F0-F4, affecting data throughput. Thus, there is a tradeoff between BER and throughput, which may be optimized for various channel quality conditions, such as SINR. Further, because the interference level may vary with time, the optimized tradeoff between BER and throughput may vary with time, even during the duration of a single voice call.

Figure 4A:
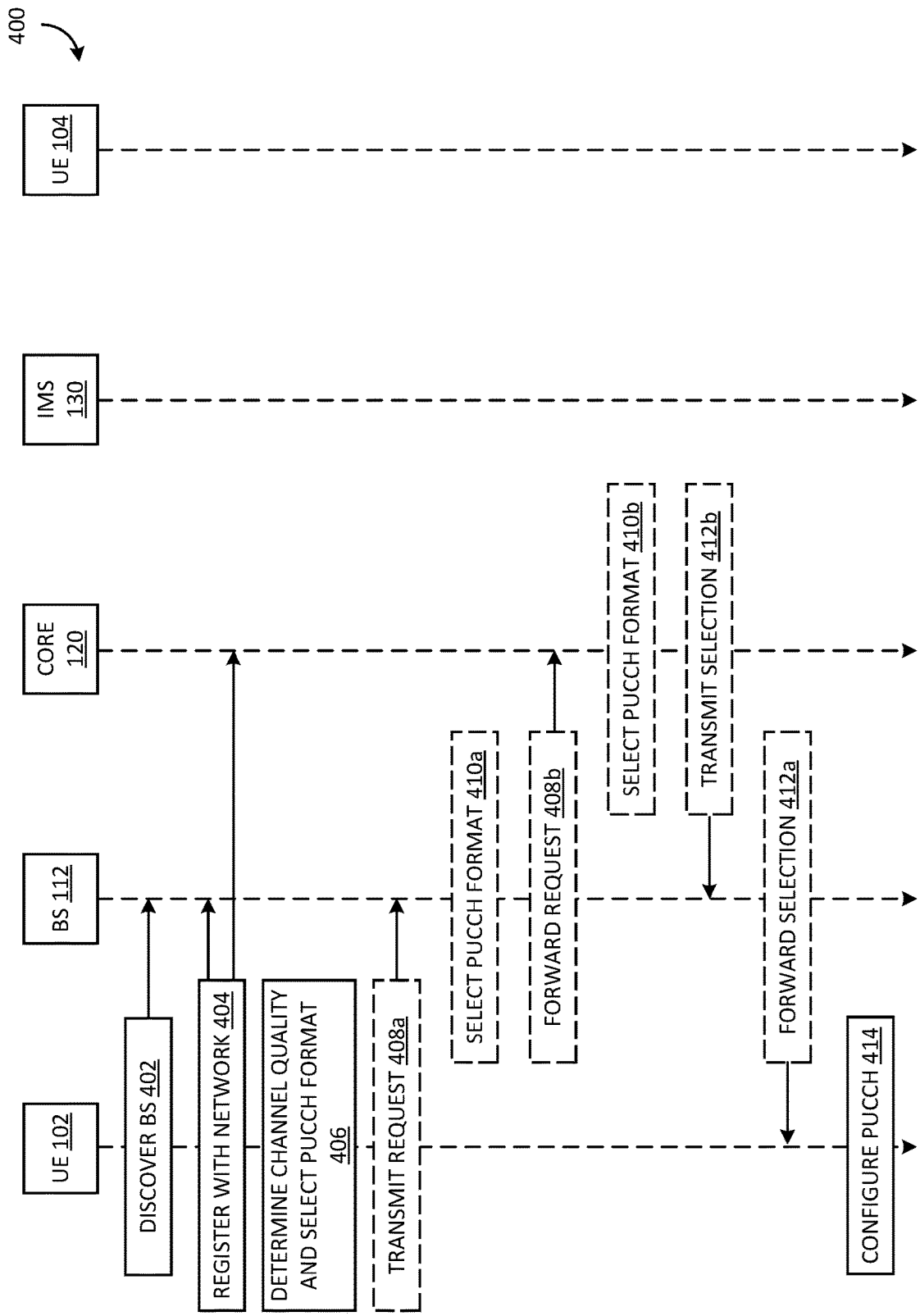
FIGS. 4A-4B illustrate a message sequence diagram of messages used in the arrangement of FIG. 1.
Figure 4B:
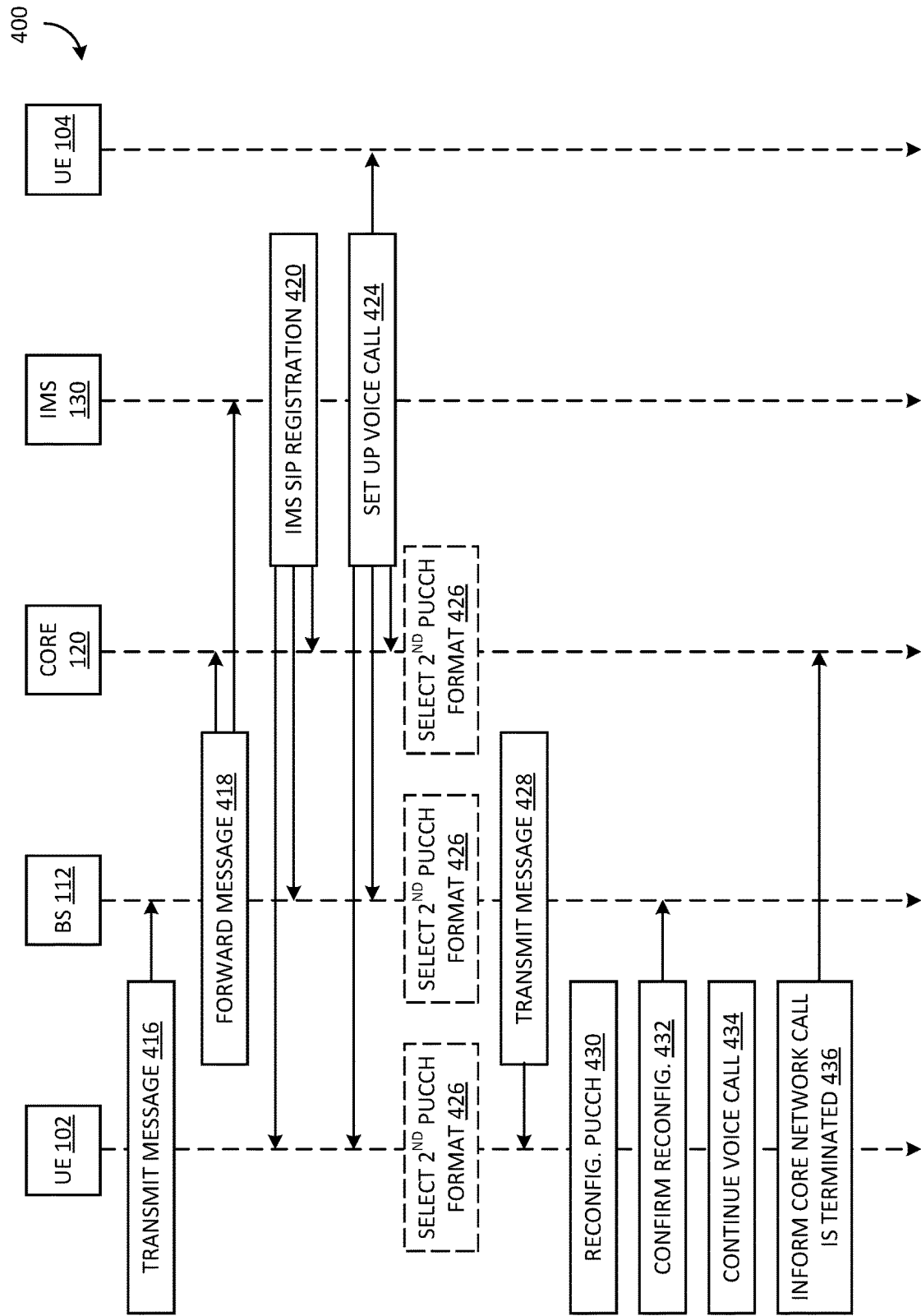

FIGS. 4A-4B collectively illustrate a message sequence diagram 400 of messages used in arrangement 100 for dynamic PUCCH allocation (by selecting a format for PUCCH 234. UE 102 discovers BS 112 (and by extension, network 110) and transmits a message 402 to the BS 112. UE 102 registers 404 with network 110 (specifically core network 120) with another message. In some examples, at 406, UE 102 determines a channel quality of the uplink side of air interface 114 and may select a PUCCH format. In examples, in which UE 102 selects the PUCCH format, UE 102 transmits a request 408a to BS 112 to be assigned that selected format. In some examples, BS 112 selects the PUCCH format at 410a, or approves request 408a (for the PUCCH format selected by UE 102). In some examples, BS 112 forwards 408b the request 408a to core network 120 as a message, specifically to PUCCH format assignment function 124 within core network 120 (if that is where PUCCH format assignment function 124 is located). In some examples, the message forwarded in 408b comprises channel quality information for air interface 114, and core network 120 selects the PUCCH format at 410b.

Criteria for selecting a PUCCH format may include HO triggers, geographic boundaries, location of UE 102 relative to BS 112, BER measurements, SINR, dropped call rates, and feedback from network 110. In some examples, PUCCH format assignment function 124 comprises AI that monitors call parameters (e.g., signal power, errors, interference, and distance from the BS) for making the selection and determining a trigger condition.

Multiple options are available for which of UE 102, BS 112, and core network 120 selects the PUCCH format, either alone or in conjunction with one or more of the other nodes. Any of UE 102, BS 112, and core network 120 may assist with determining a channel quality of the uplink side of air interface 114 (the channel between UE 102 and BS 112). UE 102 and/or BS 112 may make measurements using messages 402 and/or 404, for example, and/or BS may forward measurement data to core network 120 using a message in 408b. In some examples, determining the channel quality comprises determining an SINR and/or a BER If core network 120 selects the PUCCH format, core network 120 transmits this selection to BS 112 at 412b, and BS 112 forwards the message in 412b to UE 102 at 412a (e.g., using RRC or DCI). If BS 112 selected the PUCCH format, or approved the request for a specific PUCCH format, BS 112 transmits this selection (or approval) as message 412a to UE 102. Whichever node made the selection, message 412a instructs UE 102 to configure PUCCH 234 according to the selected PUCCH format.

UE 102 configures PUCCH 234 as instructed, at 414. UE 102 responds and communicates with BS 112 with a message at 416, in the selected PUCCH format. The message requests network session 142 and is used for packet data unit (PDU) session establishment with IMS 130. The message is received at BS 112 and forwarded to core network 120 at 418. At 420, the IMS core 120 performs IMS session initiation protocol (SIP) registration. SIP is a signaling protocol, widely used for setting up, connecting and disconnecting communication sessions, typically voice or video calls over the internet. SIP may be used for setting up, modifying and terminating two-party (unicast), or multi-party (multicast) sessions consisting of one or more media streams. SIP registration is the process in which the endpoint (e.g., UE 102) sends a SIP register message to a SIP server or a VoIP provider. A voice call is set up at 424 (also identified as network session 142), and may include a SIP invite, which is a message sent by the calling party (e.g., UE 102), inviting the recipient (e.g., UE 104) for a session (e.g., network session 142).

During voice call 424 (network session 142), which uses the first selected PUCCH format, BS 112, UE 102, and/or core network 120 (specifically PUCCH format assignment function 124) monitors for channel conditions indicating that a different a PUCCH format would improve expected channel quality between UE 102 and BS 112. At 426, in the event of a trigger, BS 112, UE 102, and/or core network 120 selects a second PUCCH format and BS 112 transmits 428 a message to UE 102 (e.g., using RRC or DCI), instructing the UE to configure the PUCCH according to the second selected PUCCH format.

UE 102 dynamically reconfigures PUCCH 234 as instructed, at 430, and confirms 432 this to BS 112 with a message. UE 102 continues the voice call as voice call a 434, (also identified as network session 142), but now using the second PUCCH format. Voice call at 434 continues until UE 102 informs 426 core network 120 that voice call at 434 is terminated (or the reverse).

Figure 5:
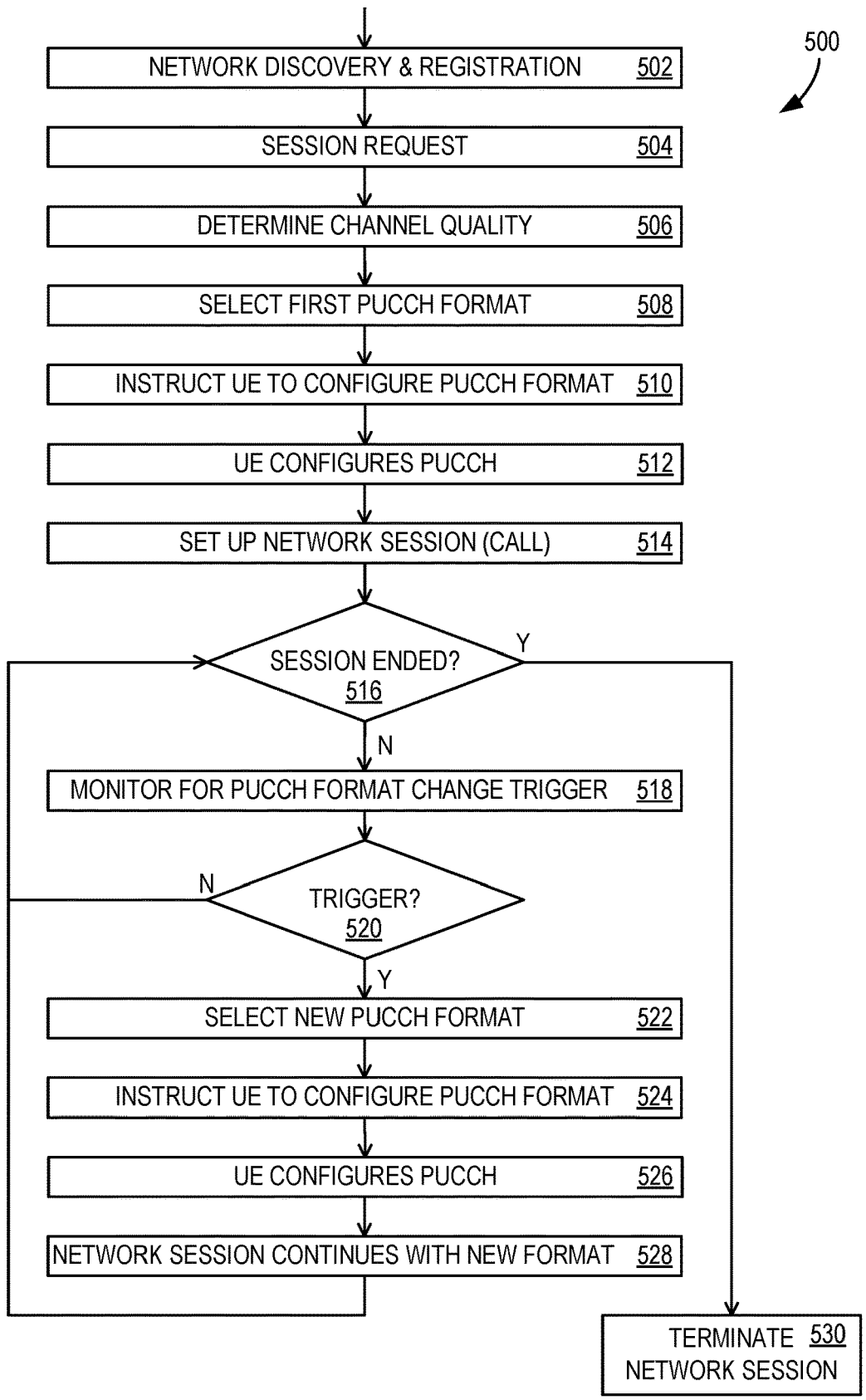
FIG. 5 illustrates an exemplary flowchart of exemplary operations associated with the arrangement of FIG. 1.

FIG. 5 illustrates a flowchart 500 of exemplary operations associated with PUCCH allocation, for example, showing a set of operations that produces messages indicated by message sequence diagram 400. In some examples, at least a portion of flowchart 500 may be performed using one or more computing devices 700 of FIG. 7. Operation 502 includes network discovery and registration. Operation 504 includes receiving, at BS 112 on network 110, a session request message (e.g., message 418) from UE 102, the session request message requesting network session 142. In some examples, BS 112 comprises a 5G gNB. In some examples, the session request message comprises a SIP invite. In some examples, network session 142 comprises a voice call. In some examples, network session 142 comprises a VoNR call.

Operation 506 includes, based on at least receiving the session request message from UE 102, determining a channel quality of a channel (e.g., air interface 114) between UE 102 and BS 112. In some examples, the channel between UE 102 and BS 112 comprises an uplink channel. In some examples, determining the channel quality comprises determining a SINR of the channel between UE 102 and BS. In some examples, determining the channel quality comprises determining a BER of the channel between UE 102 and BS. Operation 508 includes, based on at least the channel quality between UE 102 and BS 112, selecting a first PUCCH format. In some examples, network 110 selects the first PUCCH format (e.g. BS 112 or core network 120, either one using a PUCCH format assignment function 124). In some examples, UE 102 selects the first PUCCH format. In examples in which UE 102 selects the first PUCCH format, UE 102 also requests the first selected PUCCH format from network 110, in operation 508.

Operation 510 includes transmitting a message (e.g., message 412a), from BS 112, to UE 102, instructing UE 102 to configure PUCCH 234 according to the first selected PUCCH format. UE 102 configures PUCCH 234 as instructed, in operation 512. Network session 142 (e.g., a voice call) is set up in operation 514. Decision operation 516 determines whether network session 142 is ongoing or has ended. If it is ongoing, operation 518 includes monitoring for a PUCCH format change trigger. In some examples, monitoring for a PUCCH format change trigger comprises monitoring for channel conditions indicating that a different a PUCCH format would improve expected channel quality between UE 102 and BS 112. In some examples, monitoring for a PUCCH format change trigger further comprises: comparing the expected channel quality between UE 102 and BS 112 with a change threshold, wherein the PUCCH format change trigger comprises the expected channel quality between UE 102 and BS 112 meeting or exceeding the change threshold.

Decision operation 520 determines whether the PUCCH format change trigger has occurred. If so, operation 522 includes, based on at least detecting the PUCCH format change trigger, selecting a new PUCCH format different than the first (or prior) PUCCH format. In some examples, network 110 selects the new PUCCH format. In some examples, UE 102 selects the new PUCCH format. In examples in which UE 102 selects the new PUCCH format, UE 102 also requests the new selected PUCCH format from network 110, in operation 522. Operation 524 includes transmitting a message, from BS 112, to UE 102, instructing UE 102 to configure the PUCCH according to the new selected PUCCH format.

UE 102 configures PUCCH 234 as instructed, in operation 526. Network session 142 continues with the new format, in operation 528. Flowchart 500 returns to decision operation 516 to determine whether network session 142 is ongoing or has ended. If decision operation 520 had earlier determined that there was no trigger, flowchart 500 also returns to decision operation 516. When network session 142 ends, flowchart moves to operation 530 for the termination of network session 142.

Figure 6:
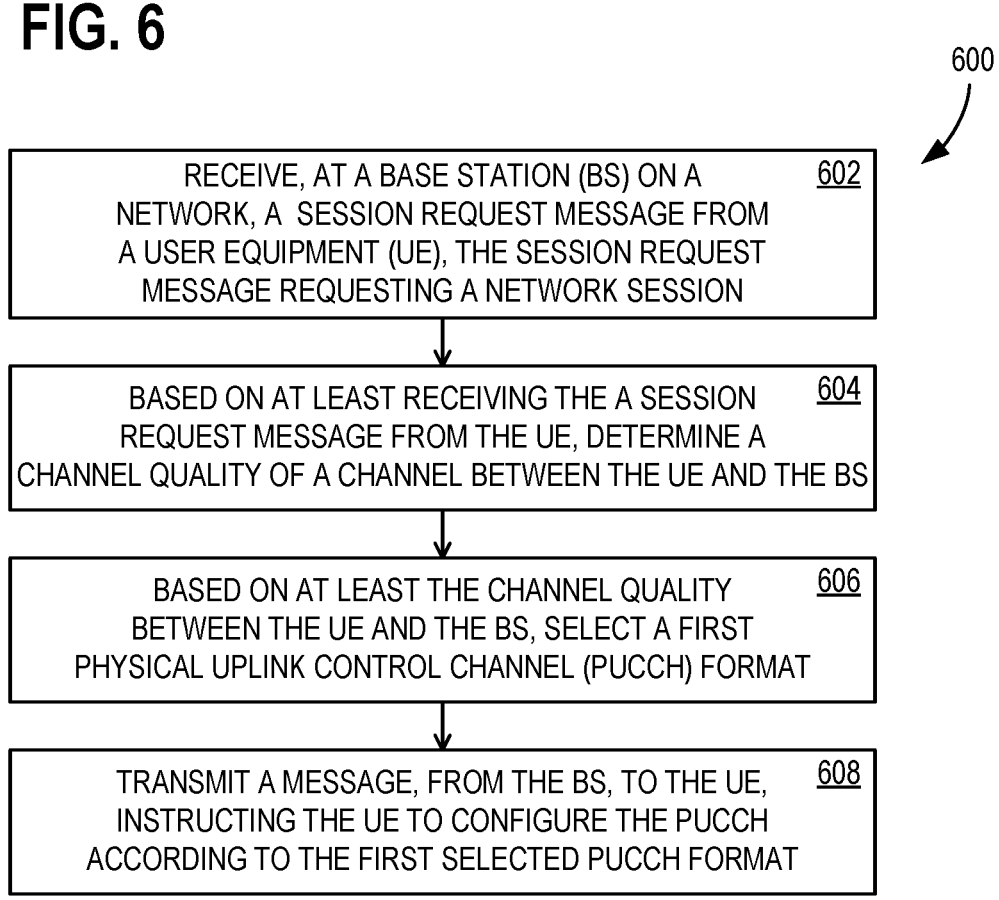
FIG. 6 illustrates another flowchart of exemplary operations associated with the arrangement of FIG. 1.

FIG. 6 also illustrates a flowchart 600 of exemplary operations associated with PUCCH allocation. In some examples, at least a portion of flowchart 600 may be performed using one or more computing devices 700 of FIG. 7. Operation 602 includes receiving, at a BS on a network, a session request message from a UE, the session request message requesting a network session. Operation 604 includes, based on at least receiving the session request message from the UE, determining a channel quality of a channel between the UE and the BS. Operation 606 includes based on at least the channel quality between the UE and the BS, selecting a first PUCCH format. Operation 608 includes transmitting a message, from the BS, to the UE, instructing the UE to configure the PUCCH according to the first selected PUCCH format.

Figure 7:
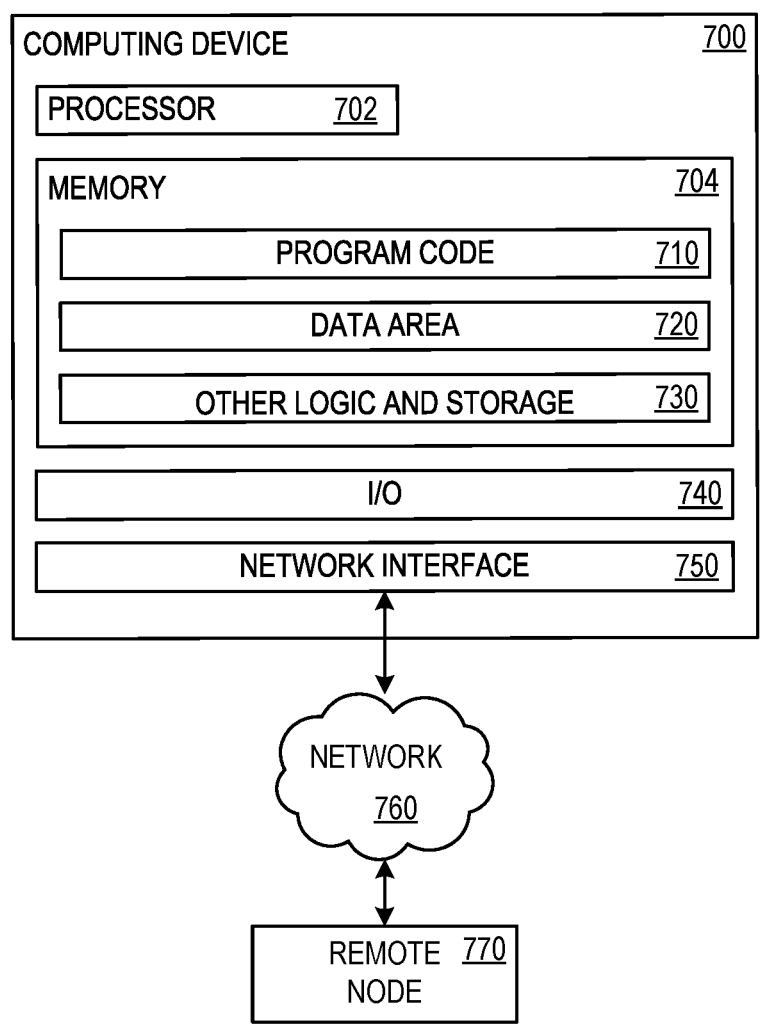
FIG. 7 illustrates a block diagram of a computing device suitable for implementing various aspects of the disclosure.

FIG. 7 illustrates a block diagram of computing device 700 that may be used as a component of arrangement 100a of FIG. 1A and/or arrangement 100b of FIG. 1B, for example, as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including any instructions necessary to perform operations described herein. Data area 720 holds any data necessary to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over a network 760 with a remote node 770, which may represent another implementation of computing device 700.

Additional Examples

An example method of PUCCH allocation comprises: receiving, at a BS on a network, a session request message from a UE, the session request message requesting a network session; based on at least receiving the session request message from the UE, determining a channel quality of a channel between the UE and the BS; based on at least the channel quality between the UE and the BS, selecting a first PUCCH format; and transmitting a message, from the BS, to the UE, instructing the UE to configure the PUCCH according to the first selected PUCCH format.

An example system for PUCCH allocation comprises: a processor; and a computer-readable medium storing instructions that are operative upon execution by the processor to: receive, at a base station (BS) on a network, a session request message from a user equipment (UE), the session request message requesting a network session; based on at least receiving the session request message from the UE, determine a channel quality of a channel between the UE and the BS; based on at least the channel quality between the UE and the BS, select a first PUCCH format; and transmit a message, from the BS, to the UE, instructing the UE to configure the PUCCH according to the first selected PUCCH format.

One or more example computer storage devices has computer-executable instructions stored thereon, which, upon execution by a computer, cause the computer to perform operations comprising: receiving, at a BS on a network, a session request message from a UE, the session request message requesting a network session; based on at least receiving the session request message from the UE, determining a channel quality of a channel between the UE and the BS; based on at least the channel quality between the UE and the BS, selecting a first PUCCH format; and transmitting a message, from the BS, to the UE, instructing the UE to configure the PUCCH according to the first selected PUCCH format.

Alternatively, or in addition to the other examples described herein, examples include any combination of the following:
- monitoring for a PUCCH format change trigger;
- based on at least detecting the PUCCH format change trigger, selecting a second PUCCH format different than the first PUCCH format;
- transmitting a message, from the BS, to the UE, instructing the UE to configure the PUCCH according to the second selected PUCCH format;
- monitoring for a PUCCH format change trigger comprises monitoring for channel conditions indicating that a different a PUCCH format would improve expected channel quality between the UE and the BS;
- monitoring for a PUCCH format change trigger further comprises: comparing the expected channel quality between the UE and the BS with a change threshold, wherein the PUCCH format change trigger comprises the expected channel quality between the UE and the BS meeting or exceeding the change threshold;
- the channel between the UE and the BS comprises an uplink channel;
- determining the channel quality comprises determining an SINR of the channel between the UE and BS;
- determining the channel quality comprises determining a BER of the channel between the UE and BS;
- the network selects the first PUCCH format;
- the network selects the second PUCCH format;
- the UE selects the first PUCCH format;
- the UE selects the second PUCCH format;
- network session comprises a voice call;
- network session comprises a VoNR call;
- the session request message comprises an SIP invite; and
- the base station comprises a 5G gNB.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of physical uplink control channel (PUCCH) allocation, the method comprising:
   receiving, at a base station (BS) on a network, a session request message from a user equipment (UE), the session request message requesting a network session;
   based on at least receiving the session request message from the UE, determining a channel quality of a channel between the UE and the BS;
   based on at least the determined channel quality between the UE and the BS, selecting a first PUCCH format;
   monitoring for channel conditions indicating that a second PUCCH format would improve expected channel quality between the UE and the BS;
   comparing the expected channel quality between the UE and the BS with a change threshold, wherein the change threshold measures a difference in i) the determined channel quality of the channel between the UE and the BS and ii) the expected channel quality of the second PUCCH format; and
   based on the expected channel quality between the UE and the BS meeting or exceeding the change threshold, transmitting a message, from the BS, to the UE, instructing the UE to configure the PUCCH according to the second PUCCH format.

2. The method of claim 1, further comprising:
   monitoring for a PUCCH format change trigger, wherein monitoring for the PUCCH format change trigger includes the monitoring for channel conditions indicating that the second PUCCH format would improve expected channel quality between the UE and the BS;
   based on at least detecting the PUCCH format change trigger, selecting the second PUCCH format different than the first PUCCH format; and
   transmitting a message, from the BS, to the UE, instructing the UE to configure the PUCCH according to the second selected PUCCH format.

3. The method of claim 2, wherein the PUCCH format change trigger comprises the expected channel quality between the UE and the BS meeting or exceeding the change threshold.

4. The method of claim 1, wherein determining the channel quality comprises determining a signal-to-interference-plus-noise ratio (SINR) of the channel between the UE and BS.

5. The method of claim 1, wherein the network selects the first PUCCH format.

6. The method of claim 1, wherein the session request message comprises a session initiation protocol (SIP) invite.

7. The method of claim 1, wherein the channel conditions include a changed distance between the UE and the BS.

8. A system for physical uplink control channel (PUCCH) allocation, the system comprising:
   a processor; and
   a non-transitory computer-readable medium storing instructions that are operative upon execution by the processor to:
   receive, at a base station (BS) on a network, a session request message from a user equipment (UE), the session request message requesting a network session;
   based on at least receiving the session request message from the UE, determine a channel quality of a channel between the UE and the BS;
   based on at least the determined channel quality between the UE and the BS, select a first PUCCH format;
   monitor for channel conditions indicating that a second PUCCH format would improve expected channel quality between the UE and the BS;

compare the expected channel quality between the UE and the BS with a change threshold, wherein the change threshold measures a difference in i) the determined channel quality of the channel between the UE and the BS and ii) the expected channel quality of the second PUCCH format; and based on the expected channel quality between the UE and the BS meeting or exceeding the change threshold, transmit a message, from the BS, to the UE, instructing the UE to configure the PUCCH according to the second PUCCH format.

9. The system of claim 8, wherein the operations are further operative to:

monitor for a PUCCH format change trigger;

based on at least detecting the PUCCH format change trigger, select a second PUCCH format different than the first PUCCH format; and transmit a message, from the BS to the UE, instructing the UE to configure the PUCCH according to the second selected PUCCH format.

10. The system of claim 8, wherein the channel between the UE and the BS comprises an uplink channel.

11. The system of claim 8, wherein determining the channel quality comprises determining a bit error rate (BER) of the channel between the UE and BS.

12. The system of claim 8, wherein the network session comprises a voice call.

13. The system of claim 8, wherein the base station comprises a fifth generation mobile network (5G) gNodeB (gNB).

14. One or more computer storage devices having computer-executable instructions stored thereon, which, upon execution by a computer, cause the computer to perform operations comprising:

receiving, at a core network, a session request message from a base station (BS) forwarded from a user equipment (UE), the session request message requesting a network session;

based on at least receiving the session request message from the BS, determining, by the core network, a channel quality of a channel between the UE and the BS;

based on at least the determined channel quality between the UE and the BS, selecting, by the core network, a first physical uplink control channel (PUCCH) format;

monitoring, by the core network, for channel conditions indicating that a second PUCCH format would improve expected channel quality between the UE and the BS;

comparing, by the core network, the expected channel quality between the UE and the BS with a change threshold, wherein the change threshold measures a difference in i) the determined channel quality of the channel between the UE and the BS and ii) the expected channel quality of the second PUCCH format; and based on the expected channel quality between the UE and the BS meeting or exceeding the change threshold, transmitting a message, from the core network to the BS, the message including instructions for the UE to configure a PUCCH according to the second PUCCH format.

15. The one or more computer storage devices of claim 14, wherein the operations further comprise:

monitoring for a PUCCH format change trigger;

based on at least detecting the PUCCH format change trigger, selecting a second PUCCH format different than the first PUCCH format; and transmitting a message, from the core network to the BS, the message including instructions for the UE to configure the PUCCH according to the second selected PUCCH format.

16. The one or more computer storage devices of claim 15, wherein comprises the expected channel quality between the UE and the BS meeting or exceeding the change threshold.

17. The one or more computer storage devices of claim 14, wherein the operations further comprise receiving a message from the UE to register with the core network.

18. The one or more computer storage devices of claim 14, wherein the network session comprises a voice over new radio (VoNR) call.

19. The one or more computer storage devices of claim 18, wherein the operations further comprise, in response to receiving a message from the UE the VoNR call is complete, terminating, by the core network, the VoNR call.

20. The one or more computer storage devices of claim 18, wherein the operations further comprise transmitting, by the core network, a message to the UE that the VoNR call is terminated.

* * * * *